United States Patent [19]

Broucksou

[11] 4,046,024

[45] Sept. 6, 1977

[54] ADJUSTABLE STEERING COLUMN SUPPORT

[75] Inventor: Robert H. Broucksou, Danville, Ky.

[73] Assignee: Eaton Corporation, Cleveland, Ohio

[21] Appl. No.: 679,947

[22] Filed: Apr. 26, 1976

[51] Int. Cl.² .......................... B62D 1/18; G05G 5/16
[52] U.S. Cl. .......................................... 74/493; 74/531
[58] Field of Search ................................. 74/493, 531

[56] References Cited

U.S. PATENT DOCUMENTS

| | | | |
|---|---|---|---|
| 3,724,290 | 4/1973 | Burton | 74/493 |
| 3,803,939 | 4/1974 | Schenten | 74/493 |
| 3,977,692 | 8/1976 | Findley et al. | 74/493 X |
| 3,978,740 | 9/1976 | Selzer | 74/493 |

*Primary Examiner*—Allan D. Herrmann
*Attorney, Agent, or Firm*—Teagno & Toddy

[57] ABSTRACT

Apparatus is provided for adjustable mounting a steering column in a vehicle, whereby the column may be telescoped, tilted or both, simultaneously, by unlocking the mechanism with a single handle. The mechanism includes a pair of side frames fixed within the vehicle, and an inner tube fixed to the column and movable between the side frames. When the handle is turned to lock the mechanism, the clamping portion of the mechanism draws the slide adjusters toward the inner tube, forcing the generally heart-shaped slides toward the inner tube and biasing them away from the longitudinal axis of the mechanism. This movement of the slides forces the pin connecting each opposite pair of slides into engagement with both the front frictional surface of the inner tube and with the outer surface of the slot within which the particular pin travels, thereby trapping and frictionally holding the inner tube relative to the side frames. The mechanism takes advantage of the ability of friction type devices to be infinitely adjustable, while utilizing the frictional engagement in a manner which provides a more positive type of locking, resulting in a higher holding torque.

21 Claims, 11 Drawing Figures

ADJUSTABLE STEERING COLUMN SUPPORT

BACKGROUND OF THE DISCLOSURE

The present invention relates to adjustable steering column mechanisms, and more particularly, to such mechanisms which permit both telescoping and tilting of the column and steering wheel.

Adjustable steering columns have become quite popular, especially for commercial vehicles, such as trucks, which the operator may drive continually over a long period of time. The ability to adjust the steering column and steering wheel greatly enhances the comfort of the driver and compensates for the varying sizes of drivers and the varying seat positions utilized by different drivers.

Prior art adjustable steering column mechanisms have generally provided either a telescopic movement of the column, providing linear movement of the steering wheel toward and away from the driver, or a tilting movement of the column, providing pivotal movement of the steering wheel about an axis perpendicular to the steering column, although a few relatively complex mechanisms have provided for both telescopic and tilting movement. Among the mechanisms which have had the capability of both telescopic and tilting adjustment, there has typically been the disadvantage that more than one movement of a handle or control member would be necessary to affect both modes of movement.

Adjustable steering column mechanisms have generally been of either the detent type or the friction type. Typically, in the detent type, a detent mechanism is operable to engage a movable member having a plurality of holes or slots, each of which corresponds to a separate, discreet position of the steering column. Another disadvantage of the detent type of mechanism is that by its very nature, the manufacturing tolerances of the mating and engaging parts must be held very close in order to avoid looseness and an undesirable, noisy rattling of the parts.

In a typical mechanism of the friction type, a pair of relatively movable members (such as an inner tube and an outer tube) have adjacent surfaces clamped together with sufficient force that the resulting frictional force maintains the members in a fixed relative position. The friction type mechanism generally has the advantage of being infinitely adjustable within the given range, but generally has the disadvantage of insufficient locking force, especially when the vehicle operator swings himself into the cab while holding onto the steering wheel.

SUMMARY OF THE INVENTION

Accordingly, it is an object of the present invention to provide an adjustable steering column mechanism which is adapted for both telescoping and tilting movement of the column simultaneously, and in response to the movement of only one control handle. In the context of this disclosure the term "telescoping" is used to denote linear movement of the entire steering column toward and away from the driver.

It is another object of the present invention to provide such an adjustable steering column mechanism which is infinitely adjustable in each of the two modes of movement.

It is a related object of the present invention to provide an adjustable steering column mechanism which utilizes the infinitely adjustable feature of the friction type mechanism, as well as the positive locking feature of the detent type mechanism.

The above and other objects of the present invention are accomplished by the provision of an improved apparatus for adjustably mounting the steering column in a vehicle, the apparatus comprising a frame assembly defining a longitudinal axis and a tubular member rigidly mounted to the steering column and associated with the frame assembly for axial and rotational movement relative thereto. The tubular member includes a frictional surface and first and second frictional members are oppositely disposed about the longitudinal axis of the frame assembly and are disposed adjacent the frictional surface of the tubular member. The frame assembly includes means for guiding the movement of the first and second frictional members relative to the frame assembly. A clamping means is pivotally mounted to the tubular member for movement therewith and includes a means for actuating the clamping means, the actuating means being movable between an operative condition and a neutral condition. When the actuating means is in the operative condition the clamping means exerts a force biasing each of the first and second frictional members into frictional engagement with the adjacent frictional surface of the tubular member and with the guiding means. When the actuating means is in the neutral condition, the clamping means releases the biasing force on the first and second frictional members and permits simultaneous axial and rotational movement of the tubular member relative to the frame assembly.

DESCRIPTION OF THE PREFERRED EMBODIMENT

Figure 1:
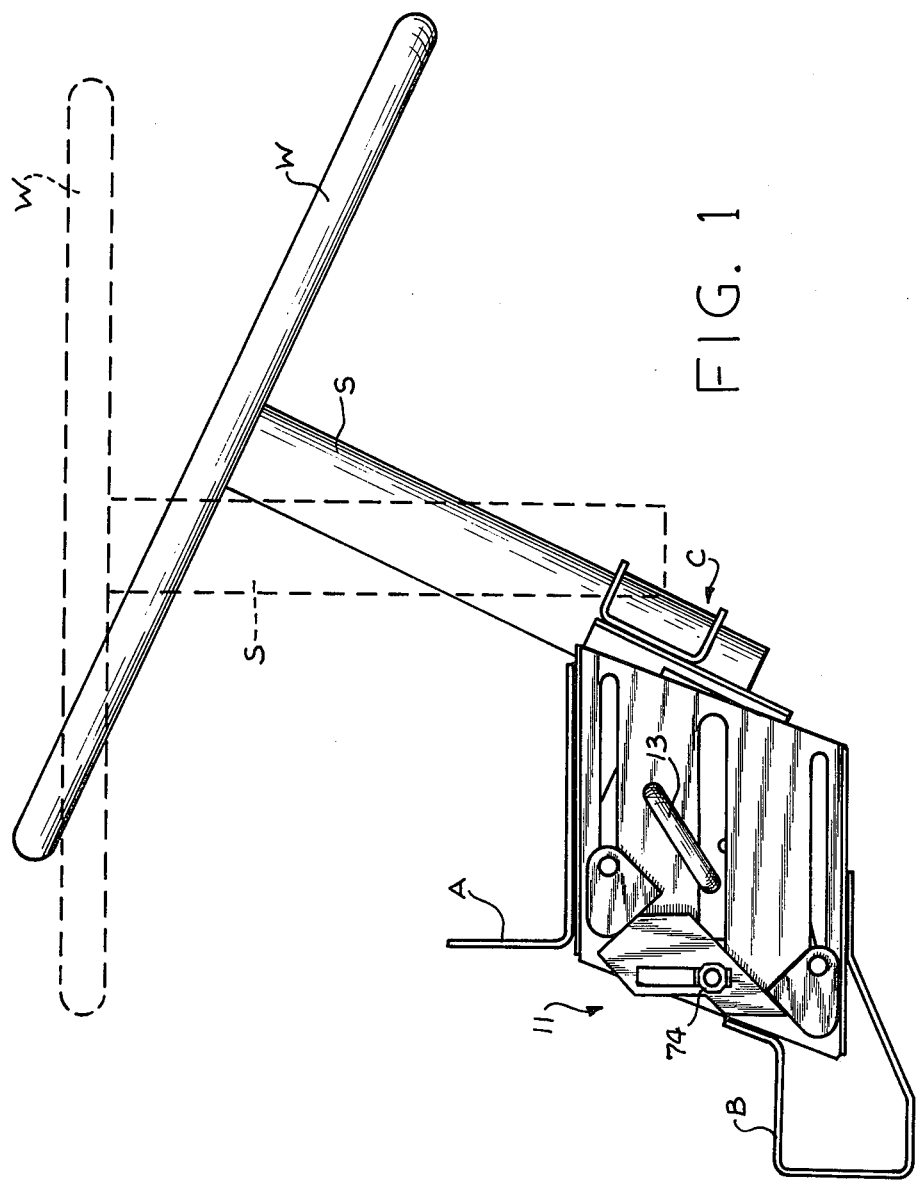
FIG. 1 is a side elevation of the adjustable steering column mechanism of the present invention, illustrating two substantially different positions of the column and steering wheel.

Referring now to the drawings, which are not intended to limit the present invention, FIG. 1 illustrates semi-schematically the installation of the mechanism of the present invention. The adjustable steering column mechanism, generally designated 11, may be installed by means of a mounting angle A and a mounting bracket B which are well-known and form no part of the present invention. Also illustrated is a steering wheel W and a steering column S which may be rigidly mounted to the movable portion of the mechanism 11 by means of a clamping assembly C. Also shown is an alternative position for the steering wheel W and steering column S, which may be moved to any desired position by rotating a handle 13 to unlock the mechanism 11 as will be described in greater detail subsequently.

Figure 2:
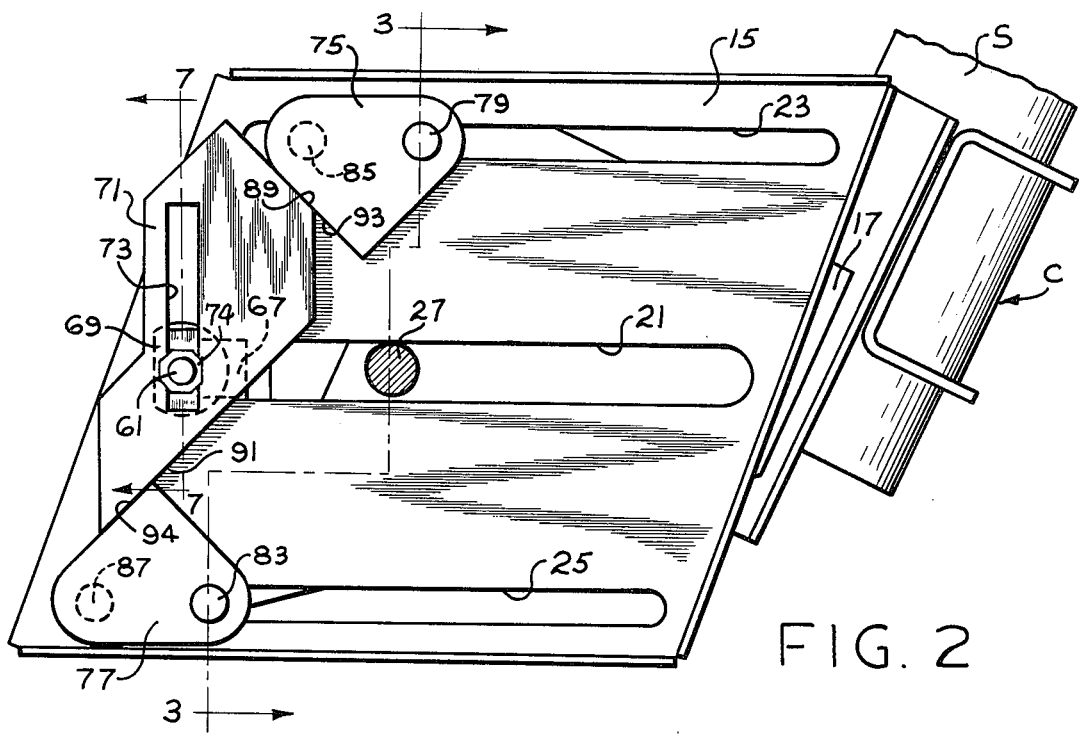
FIG. 2 is an enlarged, side elevation of the mechanism of the present invention.
Figure 3:
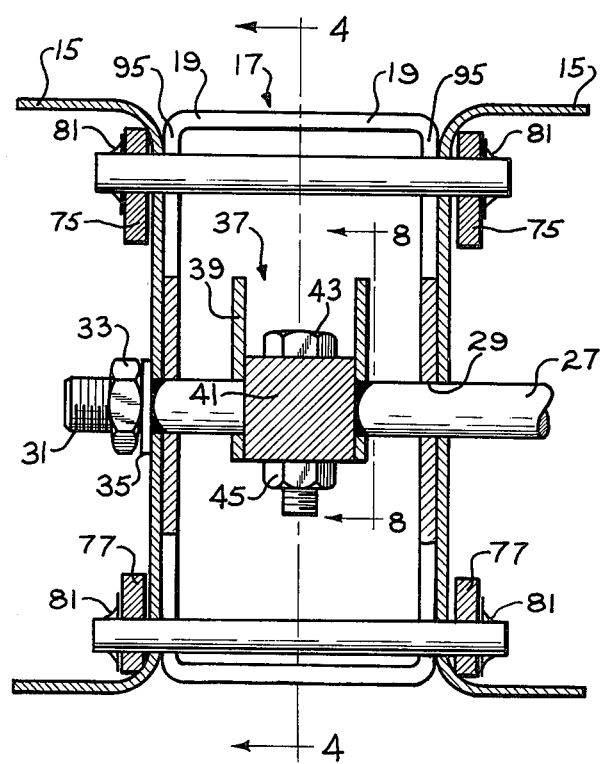
FIG. 3 is a transverse cross section taken on line 3—3 of FIG. 2.
Figure 4:
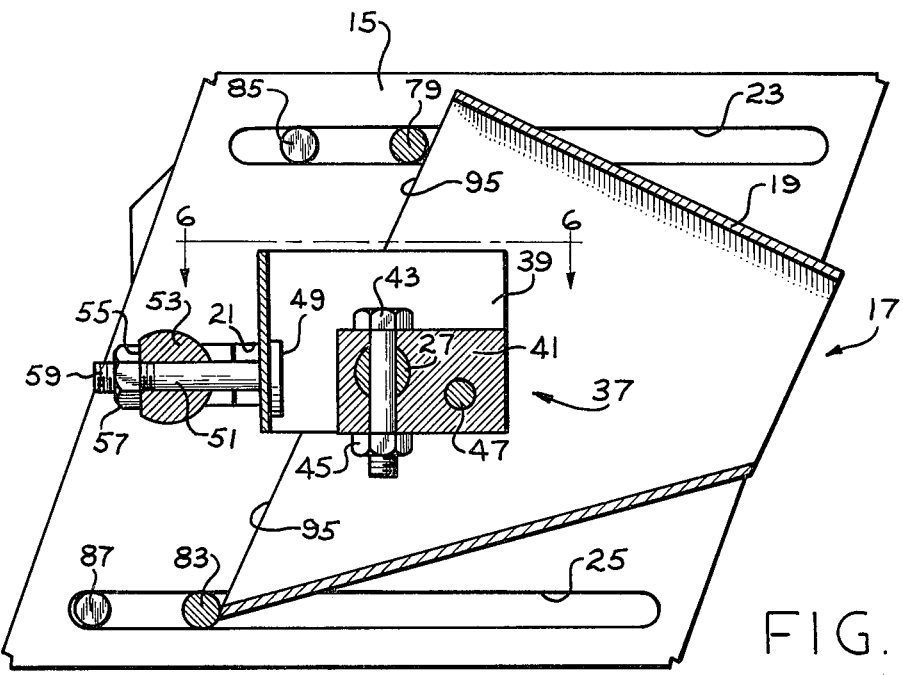
FIG. 4 is a longitudinal cross section taken on line 4—4 of FIG. 3.

Referring now to FIGS. 2 through 7, and especially to FIGS. 3 and 4, it may be seen that the mechanism 11 includes a pair of side frames 15 which are rigidly mounted within the vehicle by means of the mounting angle A and the mounting bracket B. Disposed between the side frames 15 is an inner tube 17 which, as may best be seen in FIG. 2, comprises the movable part of the mechanism 11 and is mounted to the steering column S by the clamping assembly C. The inner tube 17 is preferably formed of a pair of mating, stamped portions 19 welded into the tubular member whose profile is best seen in FIG. 3.

Each of the side frames 15 defines a longitudinally-extending large central slot 21, a longitudinally-extending upper slot 23, and a longitudinally-extending lower slot 25. The handle 13 includes a cylindrical portion 27, oriented transversely, and extending through the central slots 21 and free to move longitudinally therein when the mechanism 11 is unlocked (in the neutral condition). Each of the side panels 19 of the inner tube 17 defines a circular opening 29 through which the cylindrical portion 27 extends, such that the inner tube 17 is rotatable, relative to the side frames 15 and relative to the cylindrical portion 27, about the axis of the cylindrical portion 27. Thus, it may be seen that the tilting movement of the steering column S occurs when the inner tube 17 is rotated about the cylindrical portion 27, and the telescoping movement of the steering column S occurs when the inner tube 17 and cylindrical portion 27 move longitudinally relative to the central slot 21. At the end of the cylindrical portion 27 (see FIGS. 3 and 6) is a threaded portion 31, and in threaded engagement therewith is a nut 33, with a washer 35 disposed between the nut 33 and the adjacent side frame 15.

Figure 6:
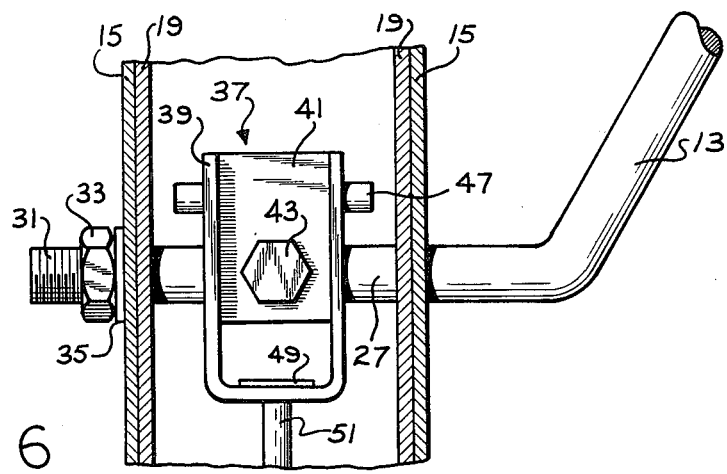
FIG. 6 is a fragmentary cross section taken on line 6—6 of FIG. 4.

The cylindrical portion 27 extends through a centrally-disposed actuating mechanism 37 which, as may best be seen in FIG. 6, includes a generally U-shaped locking channel 39, and disposed between the side walls of the locking channel 39 is an actuating bar 41. The actuating bar 41 is fixed relative to the cylindrical portion 27 by means of a bolt 43 and a nut 45 (see FIGS. 3 and 4), and the actuating bar 41 is pivotally mounted relative to the locking channel 39 by means of a pin 47.

Figure 7:
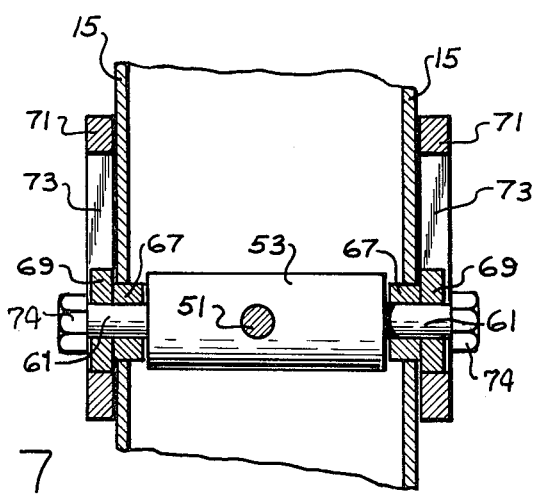
FIG. 7 is a fragmentary cross section taken on line 7—7 of FIG. 2.
Figure 7A:
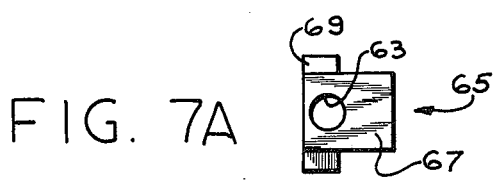
FIG. 7A is an elevation of the anti-rotation insert shown in cross section in FIG. 7.

At the forward end of the locking channel 39 is a stud member including a head portion 49, which is preferably welded to the forward wall of the locking channel 39, and a stud portion 51 extending forwardly therefrom. The stud portion 51 extends through a longitudinal bore defined by a generally cylindrical pull bar 53 which, as may best be seen in FIG. 7, is oriented transversely of the mechanism 11 and is approximately as long as the inside distance between the side frames 15. The pull bar 53 has a generally flat, forward face 55 against which is seated a nut 57, in threaded engagement with a forward, threaded portion 59 of the stud portion 51. The pull bar 53 includes a pair of oppositely-disposed, generally cylindrical end portions 61, each of which is preferably coaxial with the pull bar 53. Each of the end portions 61 extends through and is freely rotatable within a bore 63 defined by a generally T-shaped anti-rotation insert 65. The insert 65, as is best seen in FIGS. 2, 7 and 7A, includes a generally rectangular horizontal portion 67 and a generally rectangular, vertical portion 69. The horizontal portion 67 is sized to slide freely within the central slot 21, without being able to cock within the slot 21. Disposed on the outside of each of the side frames 15 is a slide adjuster 71 (see FIG. 2), each of which defines an elongated, generally rectangular slot 73, and within the slot 73 is disposed the vertical portion 69 of the insert 65. The vertical portion 69 is sized to slide freely within the slot 73, but does not permit relative angular movement therebetween for reasons which will be discussed subsequently. The portions 61 are shouldered and threaded beyond the insert 65 to receive nuts 74 which retain the slide adjuster 71 in position.

Also disposed on the outside of the side frames 15 is a pair of generally heart-shaped upper slides 75 and a pair of generally heart-shaped lower slides 77. Extending transversely through the upper slots 23 and through the upper slides 75 is a pin 79, at each end of which a fastener 81 (shown only in FIG. 3) retains the slides 75 on the pin 79. Similarly, extending transversely through the lower slots 25 and through the lower slides 77 is a pin 83, at each end of which one of the fasteners 81 retains the slides 77 on the pin 83. As may best be seen in FIGS. 4 and 5, each of the upper slides 75 includes a cylindrical projection 85 which engages the respective upper slot 23 to permit only longitudinal movement of the upper slides 75 and prevent rotational movement thereof. Similarly, each of the lower slides 77 includes a cylindrical projection 87 which engages the respective lower slot 25 to permit only longitudinal movement of the lower slides 77 and prevent rotational movement thereof.

Referring again to FIG. 2, the slide adjuster 71 includes an upper adjuster surface 89 and lower adjuster surface 91. The upper slide 75 includes a slide surface 93 which is in sliding engagement with the adjuster surface 89, and the lower slide 77 includes a slide surface 94, in sliding engagement with the lower adjuster surface 91.

The forward end of the inner tube 17 comprises a friction surface 95. When the mechanism 11 is in the locked position (see FIGS. 4 and 5), the pin 79 is forced into frictional engagement with both the friction surface 95 and the upper surface of the slot 23, and the pin 83 is forced into frictional engagement with both the friction surface 95 and the lower surface of the slot 25, thus locking the inner tube 17 in a fixed position relative to the side frames 15.

OPERATION

Figure 4A:
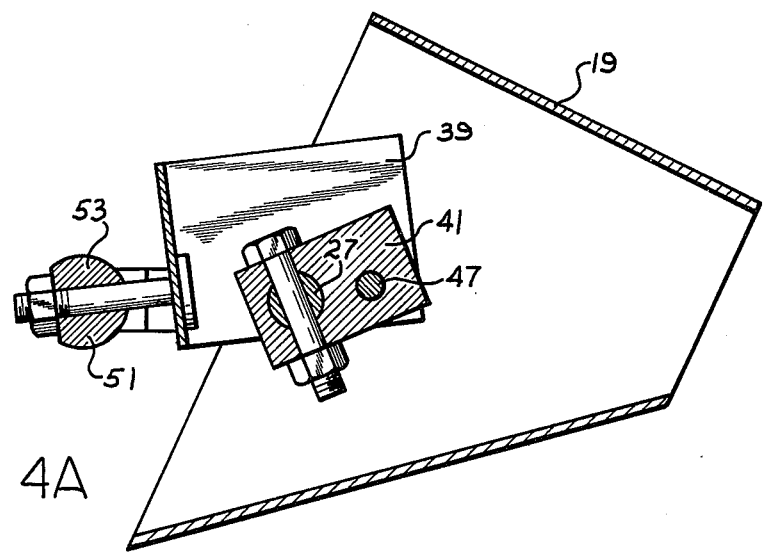
FIG. 4A is a fragmentary view, similar to FIG. 4, but with the mechanism in the unlocked position.
Figure 8:
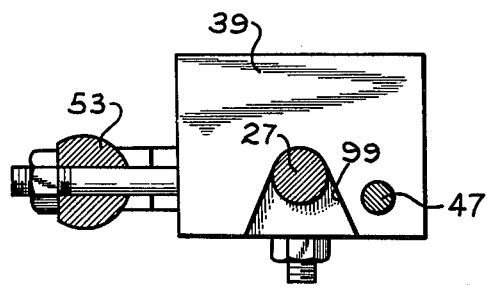
FIGS. 8 and 8A are cross sections taken on line 8—8 of FIG. 3, corresponding to the positions shown in FIGS. 4 and 4A, respectively.

The operation of the mechanism of the present invention will now be described in greater detail, using the locked position shown in FIG. 4 as the starting point, and assuming that it is desired to move the inner tube 17 from the position shown in FIG. 4 to the locked position shown in FIG. 5. When the mechanism 11 is locked, as mentioned previously, the pin 79 is in tight, frictional engagement with the friction surface 95 and the slot 23 while the pin 83 is in tight, frictional engagement with the friction surface 95 and the slot 25. In order to accomplish this, the slide adjuster 71 must be biased toward the right (in FIG. 2) with sufficient force that the upper adjuster surface 89 biases the upper slide 75 upward and to the right, so that the pin 79 engages the surface 95 and the slot 23 with sufficient frictional force, and at the same time, the lower adjuster surface 91 biases the lower slide 77 downward and to the right with sufficient force that the pin 83 engages the surface 95 and slot 25 with sufficient frictional force. In order to move the inner tube 17 therefore, it is necessary to release the biasing forces on the upper slides 75 and the lower slides 77. It will be appreciated that this may be accomplished by permitting the slide adjuster 71 to move to the left (in FIG. 2), thus disengaging the upper adjuster surface 89 from the slide surface 93 and the lower adjuster surface 91 from the slide surface 94. In order to loosen the slide adjuster 71, the handle 13 is turned to rotate the cylindrical portion 17 counter-clockwise (as seen in FIG. 4), thus turning the actuating bar 41 to the position shown in FIG. 4A, and because the actuating bar 41 is connected to the locking channel 39 by means of the pin 47, the locking channel 39 also rotates as shown in FIG. 4A, thus rotating the pull bar 53. As may be seen in a FIG. 8A, each of the side walls of the locking channel 39 includes a generally V-shaped cut-out portion 97 and an angled surface 99. Therefore, when the cylindrical portion 27 is rotated from the locked (actuated) position shown in FIG. 8 to the unlocked (neutral) position shown in FIG. 8A, the cylindrical portion 27 is spaced from the angled surface 99 which effectively increases the center-to-center distance between the pull bar 53 and the cylindrical portion 27. Because the longitudinal position of the slide adjusters 71 is controlled by the position of the anti-rotation inserts 65 which are mounted on end portions 61, it will be appreciated that turning the cylindrical portion 27 increases the longitudinal separation between the cylindrical portion 27 and the slide adjusters 71.

Figure 5:
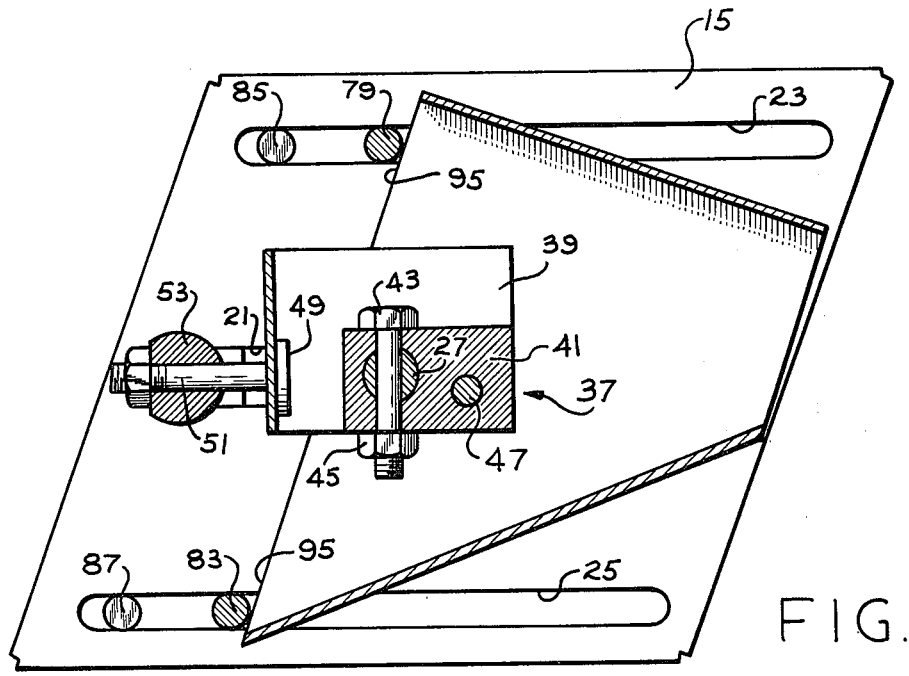
FIG. 5 is a longitudinal cross section, similar to FIG. 4, with the mechanism again locked, but positioned to have the steering column in a different position.
Figure 8A:
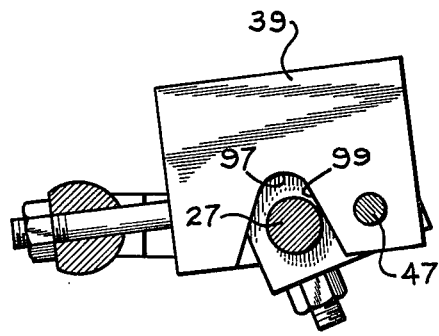

With the mechanism 11 in the unlocked position represented by FIGS. 4A and 8A, it is now possible to move the steering wheel W, the steering column S, and the inner tube 17 to the new desired position (shown in FIG. 5). It will be noted by comparing FIGS. 4 and 5 that for purposes of this explanation, the movement of the inner tube 17 has the effect of decreasing the acute angle defined by the friction surface 95 and a vertical plane, such that the inner tube 17 has effectively been rotated several degrees counterclockwise about the cylindrical portion 27. This movement of the inner tube 17 and friction surface 95 forces the upper slides 75 to the left in FIG. 2 and the leftward movement of the slides 75 forces the slide adjusters 71 downwardly, with the downward movement forcing the lower slide 77 to the right. Therefore, as the lower part of the friction surface 95 moves toward the right, the pin 83 is forced to "follow" the movement of the surface 95. When the wheel W, column S and inner tube 17 are in the desired position, the mechanism is again locked simply by turning the handle 13 clockwise, back to its original position.

It will be appreciated that the same would be true, but in reverse, if the inner tube 17 were rotated clockwise relative to the cylindrical portion 27. It should also be understood by those skilled in the art that in order for the movement of the upper slides 75 in one direction to result in the movement of the slides 77 in the opposite direction, as described above, the upper and lower adjuster surfaces 89 and 91 and the slide surfaces 93 and 94 should all be oriented at substantially 45° relative to the longitudinal axis of the mechanism (or to the vertical axis defined by the vertical slot 73). It should also be apparent that the slots 23 and 25 which guide the longitudinal movement of the slides 75 and 77, respectively, must be oriented substantially parallel to the longitudinally extending central slot 21 in order to prevent either binding or excessive looseness as the slides and the slide adjuster are moved to various positions along the slots 21, 23 and 25. It should be noted that the upper slots 23 and the lower slots 25 are disposed about as far from the central slot 21 as is possible in order that the frictional force applied against friction surface 95 will have a long enough lever arm (i.e., the distance from the pivot point or axis of cylindrical portion 27) to provide a sufficient holding torque acting on the inner tube 17.

Although the present invention has been described in connection with one specific embodiment, it will be understood that many modifications and alterations in this specific hardware will fall within the contemplated scope of the invention. For example, it should be apparent that the fixed portion of the mechanism (i.e., the side frames 15) may be disposed within the movable portion (i.e., the inner tube 17). It is a feature of the present invention that the mechanism provides for both telescopic (longitudinal) and tilting (rotational) movement of the inner tube 17 and steering wheel W, while at the same time, taking advantage of the infinitely adjustable feature of the friction type mechanisms and utilizing friction in a manner which more or less provides a positive-action type of locking.

I claim:

1. Apparatus for adjustably mounting a steering column in a vehicle, comprising:
   a. a frame assembly fixedly mounted within the vehicle and defining a longitudinal axis;
   b. a movable member rigidly mounted to the steering column and operatively associated with said frame assembly for longitudinal and rotational movement relative thereto, said movable member including a frictional surface;
   c. first and second frictional members oppositely disposed about said longitudinal axis and disposed adjacent said frictional surface;
   d. said frame assembly including means for guiding the movement of said first and second frictional members relative to said frame assembly;
   e. clamping means pivotally mounted to said movable member for movement therewith, said clamping means including means for actuating said clamping means, said actuating means being movable between an operative condition and a neutral condition;
   f. said clamping means, with said actuating means in said operative condition, exerting a force biasing each of said first and second frictional members into frictional engagement with said adjacent frictional surface of said movable member and with said guiding means to maintain said movable member in a fixed position relative to said frame assembly; and
   g. said clamping means, with said actuating means in said neutral condition, releasing said biasing force on said first and second frictional members and permitting simultaneous longitudinal and rotational movement of said movable member relative to said frame assembly.

2. Apparatus as claimed in claim 1 wherein said clamping means includes an adjuster member having a first portion disposed to engage said first frictional member and a second portion disposed to engage said second frictional member.

3. Apparatus as claimed in claim 2 wherein said clamping means includes means permitting movement of said adjuster member perpendicular to said longitudinal axis when said actuating means is in said neutral condition.

4. Apparatus as claimed in claim 3 wherein said first portion of said adjuster member is configured to cause movement of said first portion toward said longitudinal axis in response to movement of said first frictional member in one direction.

5. Apparatus as claimed in claim 4 wherein said second portion of said adjuster member is configured such that, in response to said movement of said first portion, said second portion causes said second frictional member to move in a direction opposite that of said first frictional member.

6. Apparatus as claimed in claim 2 wherein said actuating means includes a handle member mounted for rotation relative to said movable member about an axis generally perpendicular to said longitudinal axis and a linkage connecting said handle member and said clamping means, rotation of said handle member resulting in movement of said adjuster member generally parallel to said longitudinal axis.

7. Apparatus as claimed in claim 6 wherein said handle member is rotatable between one position corresponding to said operative condition of said actuating means and another position corresponding to said neutral condition of said actuation means.

8. Apparatus as claimed in claim 1 wherein said clamping means includes an adjuster member having first and second adjuster surfaces oppositely disposed about said longitudinal axis and adapted to engage said first and second frictional members, respectively.

9. Apparatus as claimed in claim 8 wherein said means for guiding the movement of said frictional members comprises a first pair of substantially parallel slots defined by said frame assembly and a second pair of substantially parallel slots defined by said frame assembly, said first and second pairs of slots being oriented generally parallel and oppositely disposed about said longitudinal axis.

10. Apparatus as claimed in claim 9 wherein said first frictional member comprises an elongated member normally oriented transversely of said apparatus and extending through said first pair of slots and said second frictional member comprises an elongated member oriented transversely of said apparatus and extending through said second pair of slots.

11. Apparatus as claimed in claim 10 wherein said first frictional member further comprises a first slide member having said first elongated member extending therethrough, said first slide member being restrained against rotation relative to said first elongated member, said second frictional member further comprising a second slide member having said second elongated member extending therethrough, said second slide member being restrained against rotation relative to said second elongated member.

12. Apparatus as claimed in claim 11 wherein said first slide member includes a first slide surface disposed to engage said first adjuster surface, said first slide surface and said first adjuster surface being substantially parallel, said second slide member including a second slide surface disposed to engage said second adjuster surface, said second slide surface and said second adjuster surface being generally parallel.

13. Apparatus as claimed in claim 12 wherein said first slide surface and said first adjuster surface are oriented at substantially a 45° angle relative to said longitudinal axis to transmit motion of said adjuster member toward said movable member into motion of said first slide member toward said movable member and away from said longitudinal axis.

14. Apparatus as claimed in claim 12 wherein said second slide surface and said second adjuster surface are oriented at substantially a 45° angle relative to said longitudinal axis to transmit motion of said adjuster member toward said movable member into movement of said second slide member toward said movable member and away from said longitudinal axis.

15. Apparatus for adjustably mounting a steering column in a vehicle comprising:
 a. a frame assembly fixedly mounted within the vehicle and defining a longitudinal axis;
 b. a movable member rigidly mounted to the steering column and oriented within said frame assembly for longitudinal and rotational movement relative thereto, said movable member including a frictional surface oppositely disposed from the steering column;
 c. said frame assembly defining a first pair of spaced apart, elongated slots and a second pair of spaced apart, elongated slots, said first and second pairs of slots being oppositely disposed about said longitudinal axis;
 d. a first frictional assembly including a first elongated member extending through said first pair of slots and disposed adjacent said frictional surface, and a second frictional assembly including a second elongated member extending through said second pair of slots and disposed adjacent said frictional surface;
 e. clamping means pivotally mounted to said movable member for movement therewith, said clamping means including means for actuating said clamping means, said actuating means being movable between an operative, clamped condition and a neutral, unclamped condition;
 f. said clamping means, with said actuating means in said operative condition, exerting a force biasing said first elongated member into frictional engagement with said adjacent frictional surface of said movable member and with the surfaces of said first pair of slots disposed furthest from said longitudinal axis, and a force biasing said second elongated member into frictional engagement with said adjacent frictional surface of said movable member and with the surfaces of said second pair of slots disposed furthest from said longitudinal axis; and
 g. said clamping means, with said actuating means in said neutral condition, releasing said biasing forces on said first and second elongated members to permit simultaneous longitudinal and rotational movement of said movable member relative to said frame assembly prior to subsequent return of said actuating means to said operative conditon.

16. Apparatus for adjustably mounting a steering column in a vehicle, comprising:
 a. a frame assembly fixedly mounted within the vehicle and defining a longitudinal axis;
 b. a movable member rigidly mounted to the steering column and operatively associated with said frame assembly for longitudinal and rotational movement relative thereto, said movable member including a locking surface;

c. first and second locking members oppositely disposed about said longitudinal axis and disposed adjacent said locking surface;
d. said frame assembly including means for guiding the movement of said first and second locking members relative to said frame assembly;
e. clamping means pivotally mounted relative to one of said frame assembly and said movable member, said clamping means including means for actuating said clamping means, said actuating means being movable between an operative condition and a neutral condition;
f. said clamping means, with said actuating means in said operative condition, exerting a force biasing each of said first and second locking members into cooperative locking engagement with said adjacent locking surface of said movable member and with said guiding means to maintain said movable member in a fixed position relative to said frame assembly; and
g. said clamping means, with said actuating means in said neutral condition, releasing said biasing force on said first and second locking members and selectively permitting longitudinal and rotational movement of said movable member relative to said frame assembly.

17. Apparatus as claimed in claim 16 wherein said clamping means includes an adjuster member having a first portion disposed to engage said first locking member and a second portion disposed to engage said second locking member.

18. Apparatus as claimed in claim 17 wherein said clamping means includes means permitting movement of said adjuster member perpendicular to said longitudinal axis when said actuating means is in said neutral condition.

19. Apparatus as claimed in claim 18 wherein said first portion of said adjuster member is configured to cause movement of said first portion toward said longitudinal axis in response to movement of said first locking member in one direction.

20. Apparatus as claimed in claim 19 wherein said second portion of said adjuster member is configured such that, in response to said movement of said first portion, said second portion causes said second locking member to move in a direction opposite that of said first locking member.

21. Apparatus for adjustably mounting a steering column in a vehicle comprising:
a. a frame assembly fixedly mounted within the vehicle and defining a longitudinal axis;
b. a movable member rigidly mounted to the steering column and operatively associated with said frame assembly for longitudinal and rotational movement relative thereto, said movable member including a locking surface;
c. said frame assembly defining a first pair of spaced apart, elongated slots and a second pair of spaced apart, elongated slots, said first and second pairs of slots being oppositely disposed about said longitudinal axis;
d. a first locking assembly including a first elongated member extending through said first pair of slots and disposed adjacent said locking surface, and a second locking assembly including a second elongated member extending through said second pair of slots and disposed adjacent said locking surface;
e. said frame assembly defining a pair of spaced apart, centrally-located guide slots;
f. means associated with said movable member and with said guide slots for guiding the longitudinal movement of said movable member relative to said frame assembly;
g. means for selectively exerting a force biasing each of said first and second locking assemblies into cooperative locking engagement with said adjacent locking surface of said movable member and with said first and second pairs of slots, respectively, to maintain said movable member in a fixed position relative to said frame assembly and for releasing said biasing force on said first and second locking assemblies to permit movement of said movable member relative to said frame assembly.

* * * * *